US012515127B2

(12) United States Patent
Wen

(10) Patent No.: US 12,515,127 B2
(45) Date of Patent: Jan. 6, 2026

(54) PICTURE DISPLAY METHOD AND APPARATUS, TERMINAL DEVICE, AND STORAGE MEDIUM

(71) Applicant: TENCENT TECHNOLOGY (SHENZHEN) COMPANY LIMITED, Shenzhen (CN)

(72) Inventor: Yuan Wen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 581 days.

(21) Appl. No.: 17/974,753

(22) Filed: Oct. 27, 2022

(65) Prior Publication Data

US 2023/0046042 A1 Feb. 16, 2023

Related U.S. Application Data

(63) Continuation of application No. PCT/CN2022/078548, filed on Mar. 1, 2022.

(30) Foreign Application Priority Data

Mar. 4, 2021 (CN) ........................ 202110242486.X

(51) Int. Cl.
*A63F 13/426* (2014.01)
*A63F 13/52* (2014.01)
*A63F 13/55* (2014.01)

(52) U.S. Cl.
CPC ............ *A63F 13/426* (2014.09); *A63F 13/52* (2014.09); *A63F 13/55* (2014.09); *A63F 2300/6045* (2013.01)

(58) Field of Classification Search
CPC ........ A63F 13/52; A63F 13/53; A63F 13/355; A63F 13/426
See application file for complete search history.

(56) References Cited

U.S. PATENT DOCUMENTS

2013/0093664 A1 4/2013 Nishidate
2013/0117377 A1 5/2013 Miller
(Continued)

FOREIGN PATENT DOCUMENTS

CN 104954848 A 9/2015
CN 110138769 A 8/2019
(Continued)

OTHER PUBLICATIONS

The World Intellectual Property Organization (WIPO) International Search Report for PCT/CN2022/078548 Jun. 6, 2022 7 Pages (including translation).
(Continued)

*Primary Examiner* — James S. McClellan
(74) *Attorney, Agent, or Firm* — Anova Law Group, PLLC

(57) ABSTRACT

A picture display method includes receiving a game picture of a target game from a target container in a process of running the target game, the target game being a cloud game running on the target container; obtaining a control operation on the target game performed on the terminal device, and locally drawing an operation animation according to the control operation; and superposing the operation animation on the received game picture, and displaying, on a user interface, the game picture on which the operation animation is superposed.

18 Claims, 9 Drawing Sheets

(56) References Cited

U.S. PATENT DOCUMENTS

| | | | | |
|---|---|---|---|---|
| 2013/0162680 | A1* | 6/2013 | Perry | A63F 13/213 345/634 |
| 2014/0082539 | A1 | 3/2014 | Tjissen | |
| 2014/0349755 | A1 | 11/2014 | Itoh et al. | |
| 2015/0072745 | A1* | 3/2015 | Sogabe | A63F 13/573 463/3 |
| 2016/0059125 | A1 | 3/2016 | Georgiev et al. | |
| 2017/0312626 | A1* | 11/2017 | Colenbrander | A63F 13/35 |
| 2019/0065619 | A1 | 2/2019 | Kuo et al. | |
| 2019/0321725 | A1* | 10/2019 | Zimring | A63F 13/323 |
| 2021/0227286 | A1* | 7/2021 | Kusano | H04N 21/8133 |
| 2022/0058766 | A1 | 2/2022 | Zhang et al. | |
| 2023/0390637 | A1* | 12/2023 | Zhang | A63F 13/533 |

FOREIGN PATENT DOCUMENTS

| | | | |
|---|---|---|---|
| CN | 110368686 | A | 10/2019 |
| CN | 111803940 | A | 10/2020 |
| CN | 111861854 | A | 10/2020 |
| CN | 111882626 | A | 11/2020 |
| CN | 112044079 | A | 12/2020 |
| CN | 112843680 | A | 5/2021 |
| EP | 0598236 | A1 | 5/1994 |
| JP | H06131109 | A | 5/1994 |
| JP | 2013089037 | A | 5/2013 |
| JP | 2013208214 | A | 10/2013 |
| JP | 2015503141 | A | 1/2015 |
| JP | 2015523886 | A | 8/2015 |
| JP | 2017152063 | A | 8/2017 |
| JP | 2018504193 | A | 2/2018 |
| WO | 2016109066 | A1 | 7/2016 |

OTHER PUBLICATIONS

China National Intellectual Property Administration (CNIPA) Office Action 1 for 202110242486.X Oct. 21, 2022 6 Pages (including translation).

The Japan Patent Office (JPO) Notification of Reasons for Refusal for Application No. 2023-527432 and Translation Apr. 22, 2024 10 Pages.

What are containers? Essential for running cloud services, Cloud Ace, Inc., Apr. 28, 2021, <URL: https://cloud-ace.jp/column/detail183/>, Retrieved Apr. 11, 2024.

* cited by examiner

PICTURE DISPLAY METHOD AND APPARATUS, TERMINAL DEVICE, AND STORAGE MEDIUM

CROSS-REFERENCE TO RELATED APPLICATIONS

This application is a continuation application of PCT Patent Application No. PCT/CN2022/078548, filed on Mar. 1, 2022, which claims priority to Chinese Patent Application No. 202110242486.X, entitled "PICTURE DISPLAY METHOD AND APPARATUS, TERMINAL DEVICE, AND STORAGE MEDIUM" filed with the China National Intellectual Property Administration on Mar. 4, 2021, the entire content of all of which is incorporated herein by reference in their entirety.

FIELD OF THE TECHNOLOGY

This application relates to the field of computer technologies and, in particular, to picture display.

BACKGROUND OF THE DISCLOSURE

With the continuous development of the computer technology, various types of gaming applications have been provided to game users. When a user needs to experience different gaming applications, clients for those different gaming applications have to be downloaded locally. Generally, the clients corresponding to the gaming applications occupy significant memory space of the terminal device, affecting the data running process of the terminal device. Alternatively, the gaming applications may be run as cloud games in the cloud server. In a process of running a cloud game, the terminal device accesses the cloud game in the cloud server through the cloud game client without downloading the game client. and the terminal device is only configured to display a game picture.

SUMMARY

Embodiments of present disclosure provide a picture display method and apparatus, a terminal device, and a storage medium, to improve fluency of the terminal device in a process of drawing an operation animation based on a control operation performed by a game user.

One aspect of present disclosure provides a picture display method. The picture display method is performed by a terminal device and includes receiving a game picture of a target game from a target container in a process of running the target game, the target game being a cloud game running on the target container; obtaining a control operation on the target game performed on the terminal device, and locally drawing an operation animation according to the control operation; and superposing the operation animation on the received game picture, and displaying, on a user interface, the game picture on which the operation animation is superposed.

Another aspect of present disclosure provides a terminal device. The terminal device includes a processor and a memory coupled to the processor, the memory being configured to store a computer program including program instructions, and the processor being configured to invoke the program instructions to perform a picture display method. The picture display method is performed by a terminal device and includes receiving a game picture of a target game from a target container in a process of running the target game, the target game being a cloud game running on the target container; obtaining a control operation on the target game performed on the terminal device, and locally drawing an operation animation according to the control operation; and superposing the operation animation on the received game picture, and displaying, on a user interface, the game picture on which the operation animation is superposed.

Another aspect of present disclosure provides a non-transitory computer-readable storage medium, storing a computer program including program instructions, the program instructions, when executed by a processor, causing the processor to perform a picture display method. The picture display method is performed by a terminal device and includes receiving a game picture of a target game from a target container in a process of running the target game, the target game being a cloud game running on the target container; obtaining a control operation on the target game performed on the terminal device, and locally drawing an operation animation according to the control operation; and superposing the operation animation on the received game picture, and displaying, on a user interface, the game picture on which the operation animation is superposed.

In the embodiments of present disclosure, in a process of running a target game, a terminal device may request game data of the target game from a target container of a cloud server and receive a game picture of the target game on a user interface based on the game data. In addition, the terminal device may obtain a control operation on the target game, draw an operation animation corresponding to the control operation on the user interface according to the obtained control operation, and display the operation animation on the game picture in a superposed manner. The terminal device locally retains the drawing of the operation animation corresponding to the control operation and performs drawing, to improve fluency of the terminal device in a process of drawing an operation animation based on a control operation performed by a game user, so that the game user achieves gaming experience of locally performing a game operation on the terminal device, thereby improving user satisfaction.

DESCRIPTION OF EMBODIMENTS

Figure 1A:
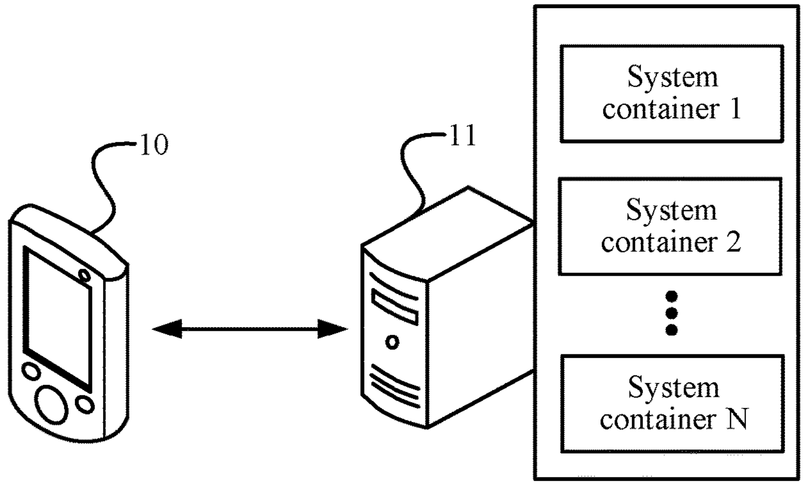
FIG. 1*a* is a schematic diagram of a picture display system according to an embodiment of present disclosure.

Embodiments of present disclosure provide a method for displaying a game picture of a cloud game, so that in a process of running the cloud game (for example, a target game), the terminal device may obtain game data of the target game from a cloud server, and display the game picture on a user interface after the game data is rendered. In addition, the terminal device locally retains an operation animation corresponding to a control operation on the target game in the terminal device for drawing, so that the terminal device may superpose the locally drawn operation animation on the game picture of the target game for display, and display, on the user interface of the terminal device, the game picture on which the operation animation is superposed. It may be understood that, the terminal device locally draws the operation animation, so that the effect of controlling the cloud game (that is, the target game) by the game user through the terminal device is the same as the effect of controlling a local game, and there is no difference between a game effect of playing the cloud game by the game user through the terminal device and an operation effect of running the local game in the terminal device. In this way, the game user can achieve operation experience of locally playing the game in the process of playing the cloud game through the terminal device, thereby improving satisfaction of the game user for playing the cloud game. The cloud server is configured to support running of a plurality of cloud games, and the cloud game (that is, the target game) mentioned in this embodiment of present disclosure is any cloud game supported by the cloud server.

The cloud game is an online gaming technology based on cloud computing technology, which may also be referred to as gaming on demand. By using the cloud gaming technology, a light-end device with relatively limited graphics processing and data computation capabilities (for example, a terminal device with a poor data computation capability, and the like) can run high-quality games. In a cloud game scene, the game runs on the cloud server rather than running on the terminal device that displays a game picture. The cloud server renders a game scene into a video/audio stream, the terminal device obtains a video/audio stream of the game scene from the cloud server through a network, and the game picture displayed in the terminal device is displayed based on the obtained video/audio stream. That is to say, the cloud game is a game running on the cloud server, and the cloud server delivers game resources to the terminal device, so that the terminal device may display (which may include "render and display" in some embodiments) a game picture of the cloud game on the user interface. It may be understood that, powerful graphics operation and data processing capabilities are not required for a terminal device corresponding to the game user, and only basic streaming media play and rendering capabilities are required.

In an embodiment, the picture display method is applicable to a picture display system shown in FIG. 1*a*. The picture display system includes a terminal device 10 and a cloud server 11. The cloud server 11 includes a plurality of system containers (which may be referred to as containers for short). The cloud server 11 shown in FIG. 1*a* may include system containers 1 to N, N being an integer greater than 1, and any system container included in the cloud server 11 may run one or more games. The terminal device 10 may transmit a running request corresponding to the target game (any cloud game) to the cloud server 11. When the target game is run by a target container in the cloud server 11, assuming that the target container is a system container 1 shown in FIG. 1*a*, after receiving the running request transmitted by the terminal device 10, the cloud server 11 may start the target game in the target container based on a running parameter (such as a game identity corresponding to the target game) included in the running request, and transmits game data of the target game to the terminal device 10. Correspondingly, the terminal device 10 may receive a game picture on a user interface based on the game data received from the cloud server 11, to display the received game picture on the user interface.

In an embodiment, after obtaining game data delivered from the cloud server 11, the terminal device 10 may receive and display the game picture on the user interface based on the obtained game data. After the game picture is received and displayed on the user interface by the terminal device, the terminal device 10 may detect a control operation on the target game, and draw an operation animation corresponding to the control operation on the user interface based on the obtained control operation, thereby locally drawing the operation animation corresponding to the control operation of the target game in the terminal device 10. It may be understood that, the operation animation corresponding to the control operation of the target game is locally retained for drawing, and operation animation corresponding to the control operation may no longer be requested to the cloud server 11. That is to say, the operation animation is locally retained in the terminal device 10, to avoid delay of displaying the operation animation caused by network delay when the cloud server is requested to draw the operation animation, so that there is no difference between display of a control effect of a target user in the terminal device 10 by the game user and local display, thereby improving gaming experience of the game user. In an embodiment, after drawing the operation animation corresponding to the control operation on the user interface based on the obtained control operation on the target game, the terminal device 10 may superpose the drawn operation animation on the game picture of the user interface, so that the game picture on which the operation animation is superposed is displayed on the user interface, the locally drawn operation animation and the game picture obtained by rendering the game data from the cloud server are displayed in a superposed manner, and the game user may achieve gaming experience of locally playing the game when playing the cloud game in the terminal device 10, thereby improving the satisfaction of the game user for playing the cloud game.

Figure 1B:
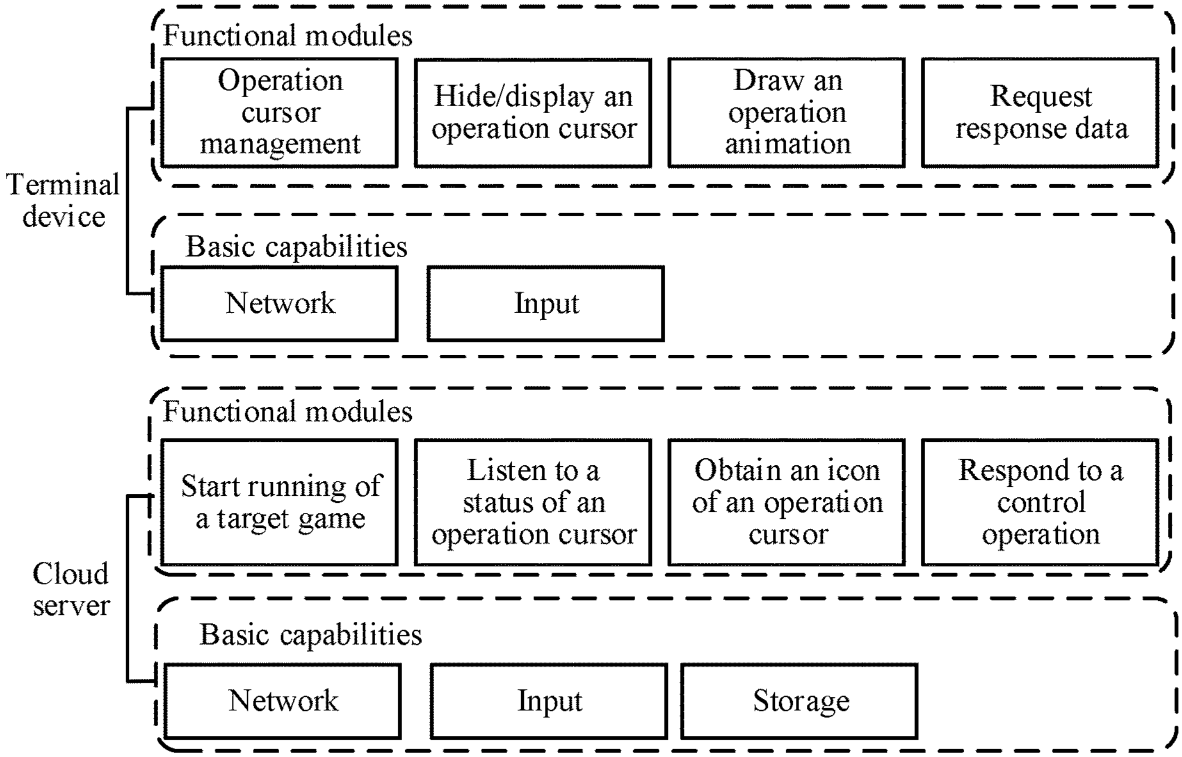
FIG. 1*b* is a schematic diagram illustrating device capabilities of a terminal device and a cloud server according to an embodiment of present disclosure.

In an embodiment, when the target game running on the terminal device 10 is operatively controlled by an operation cursor, the terminal device may display an icon of the operation cursor on the user interface, that is, the terminal device 10 retains an operation animation executed by controlling the operation cursor in a process of running the target game for locally drawing, and request game data from the cloud server 11 to receive the game picture (e.g., a rendered game picture) of the cloud game, where functional modules and corresponding basic capabilities of the terminal device 10 and the cloud server 11 in the process of running the cloud game may be shown in FIG. 1*b*. Functional modules included in the terminal device 10 are as follows:

a module for managing an operation cursor, a module for hiding/displaying an operation cursor, a module for drawing an operation animation, and a module for requesting response data of a control operation from a cloud server. The basic capabilities of the terminal device 10 include a network transmission capability and an input capability for receiving game data. In addition, functional modules included in the cloud server 11 are as follows: a module for initiating running of a target game, a module for listening to a status of an operation cursor, a module for obtaining an icon of an operation cursor, and a module for responding to a control operation. The basic capabilities of the cloud server 11 include a network transmission capability, a capability for receiving the requested input, and a storage capability for game data. In an embodiment, the cloud server 11 may listen to the status of the operation cursor to determine whether there is a need to draw the icon of the operation cursor in the terminal device 10, and transmit rendering code to the terminal device 10 if drawing is necessary, to draw the icon of the operation cursor in the terminal device. In addition, the foregoing cloud server 11 may be a node in a blockchain distributed network, and may transmit relevant data in the cloud server 11 to a blockchain network for storage.

Various embodiments of present disclosure provide picture display method. In one embodiment, the picture display method may include: receiving (and/or rendering in some examples) a game picture of a target game on a user interface according to game data delivered by a target container in a process of running the target game. The target game may be a cloud game running on the target container. The picture display method may further include obtaining a control operation on the target game and drawing an operation animation corresponding to the control operation on the user interface according to the control operation; and superposing the operation animation on the game picture, and displaying, on the user interface, the game picture on which the operation animation is superposed.

Figure 2:
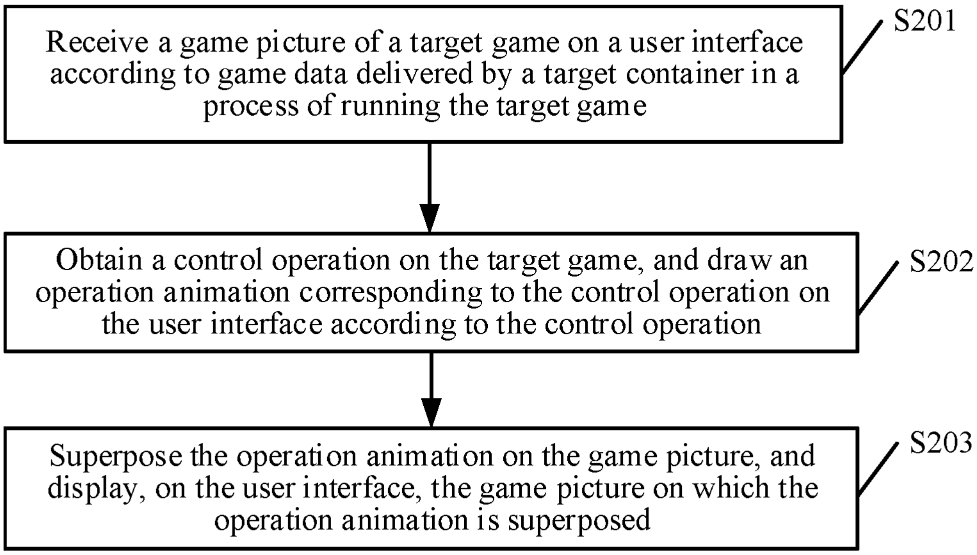
FIG. 2 is a schematic flowchart of a picture display method according to an embodiment of present disclosure.

FIG. 2 is a schematic flowchart of a picture display method according to an embodiment of present disclosure. As shown in FIG. 2, the method may include the following steps:

S201: Receive a game picture of a target game on a user interface according to game data delivered by a target container in a process of running the target game.

In an embodiment, the target game is a cloud game running on a target container, where the target container is a system container in a cloud server for supporting running of the target game. It may be understood that, since the target game is a cloud game, the terminal device may not locally download a game client of the target game when running the target game, but run the target game by requesting the target container in the cloud server. Specifically, the terminal device runs a cloud game client, which is different from a target game client. The target game client only supports running of one game (that is, the target game), while the cloud game client may support requesting running of a plurality of different cloud games from the cloud server.

In an embodiment, after the terminal device starts the cloud game client, the user interface may display identifiers of game clients corresponding to one or more cloud games. When the game user needs to start and run the target game, an identifier of a game client of the target game displayed on the user interface may be selected, the terminal device may transmit a running request of the target game to a target container of the cloud server supporting running of the target game after detecting that the game user selects the identifier of the game client of the target game, the target container may deliver game data of the target game to the terminal device after obtaining the running request for the target game, and the terminal device may receive the game picture based on the game data delivered by the target container, thereby running the target game on the terminal device.

Since the terminal device may start and run different cloud games through the cloud game client, the terminal device may download only one cloud game client without downloading the game client corresponding to different games, thereby starting and running the cloud game on the terminal device. In addition, in the process of running the cloud game, the terminal device receives the game picture only based on game data for the cloud game obtained from the cloud server, and no other processing is performed on the game data, so that requirements for the data processing capacity of the terminal device in the process of running the cloud game may be reduced, thereby expanding applicable population of the cloud game and improving popularity of the cloud game. In an embodiment, in a process of running the cloud game (such as the target game) by the terminal device, the terminal device may constantly request game data from the cloud server, and correspondingly, the cloud server continuously transmits the game data requested by the terminal device to the terminal device in the form of a data stream, so that the terminal device may smoothly display the game picture of the target game on the user interface based on the obtained game data.

When running the target game based on the game data obtained from the cloud server, the terminal device may obtain a control operation on the target game by the game user and obtain response data of the control operation from the cloud server, to control the target game. In an embodiment, to improve operation experience of the game user, after obtaining a control operation on the target game by the game user, the terminal device may locally draw an operation animation of the control operation, that is, S202 is performed. After the terminal device locally draws the operation animation of the control operation, the operation animation and the game picture of the target game may be displayed in a superposed manner, to avoid display delay due to network congestion and other reasons, thereby bring experience of locally playing the game to the game user.

S202: Obtain a control operation on the target game, and draw an operation animation corresponding to the control operation on the user interface according to the control operation.

In an embodiment, the terminal device may be a personal computer, and a target game running on the personal computer is a client game. Specifically, based on the different operating systems of a personal computer, it may be considered that operating platforms of the target game are also different. The operating system of the personal computer includes a PC (a Microsoft-based operating system) platform, or the operating system of the personal computer may also be a MAC (an operating system different from the PC platform) platform, that is, a client game running on the personal computer may be based on the PC platform or may be based on the Mac platform. It may be further understood that, when the target game is a client game running on a personal computer, the game user may control the target game through the operation cursor, where the operation cursor is mapping of an external input device of the personal computer on the user interface of the personal computer, the game user may control the operation cursor on the user interface of the personal computer by controlling the external input device, that is, when the target game is the client game running on the personal computer, the control operation on the target game obtained by the terminal device is an obtained control operation by the game user on the external input device connected with the terminal device, the control operation may be, for example, a movement operation on the operation cursor inputted into the external input device and a selection operation performed on the game picture by using the operation cursor, where the external input device may be a game handle or a mouse, and the like.

In another embodiment, the terminal device may also be a mobile terminal, and it may be understood that, the target game running on the mobile terminal is a mobile game. Since a terminal screen of the mobile terminal is a touch screen, where the game user may input data to the terminal device based on the touch screen without using an external input device, to control running of the game, when the target game is a mobile game running on the mobile terminal, the game user may control the target game based on touch of the terminal screen, that is, when the target game is a mobile game running on the mobile terminal, the control operation on the target game obtained by the terminal device is a touch operation performed by the game user, and the touch operation may be, for example, a selection operation or a sliding operation on the terminal screen by the game user.

To improve fluency of controlling the target game by the game user, after obtaining the control operation on the target game, the terminal device may locally draw the operation animation and request the cloud server of response data indicated by the control operation. Specifically, when the control operation on the target game obtained by the terminal device is a movement operation on the operation cursor, it may be understood that, the operation animation drawn by the terminal device on the user interface is a moving track of the movement operation. Alternatively, when the control operation on the target game obtained by the terminal device is a selection operation performed by using an operation cursor or a selection operation performed based on touch on the terminal screen, the operation animation of the control operation drawn on the user interface by the terminal device is an operation animation related to the selection operation, for example, an animation of a selected game setting component when a game setting component is selected, a click animation generated when a blank position of the game is clicked, and the like. In an embodiment, after the terminal device locally retains the obtained operation animation corresponding to the control operation on the target game to perform drawing, the drawn operation animation may be superposed on the game picture for display, that is, S203 is performed. The terminal device locally retains drawing of the operation animation, so that fluency of controlling the target game may be improved, thereby improving control experience of the game user on the cloud game.

S203: Superpose the operation animation on the game picture, and display, on the user interface, the game picture on which the operation animation is superposed.

Figure 3:
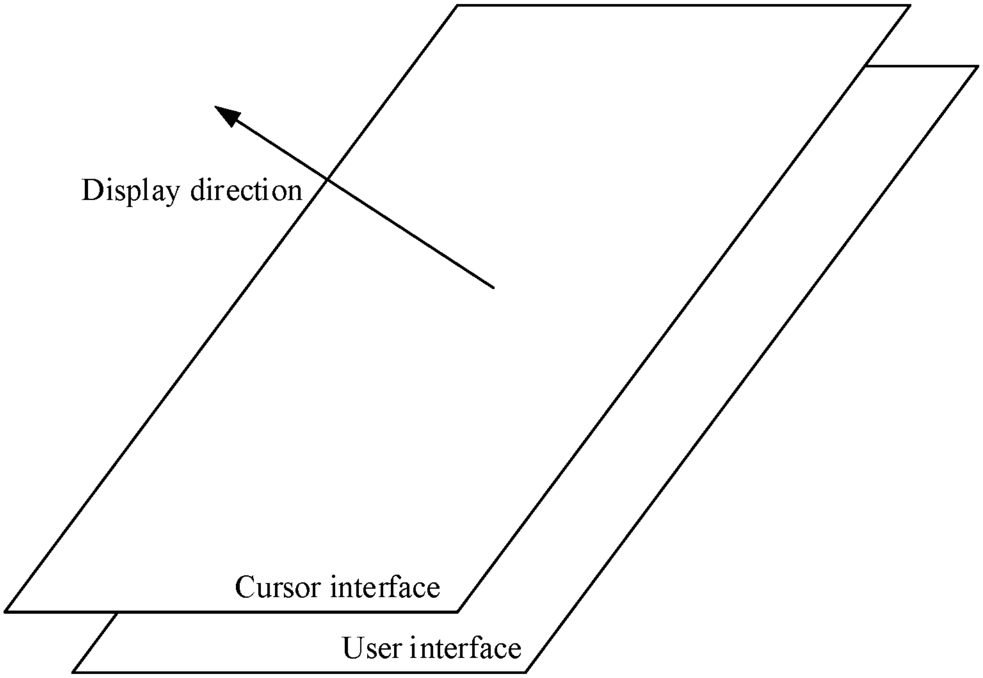
FIG. 3 is a schematic diagram illustrating interfaces displaying a game picture and an operation animation according to an embodiment of present disclosure.

In an embodiment, in the process of running the target game, the terminal device displays an interface of the operation animation interface the target game, which is displayed on the user interface of the game picture of the target game in a floating manner, that is, a cursor interface of the terminal device for displaying the operation animation is an upper layer of interface of the user interface of the game picture in a display direction, which is as shown in FIG. 3. It may be understood that, the terminal device locally retains the operation animation corresponding to the control operation on the target game to perform drawing, that is, draw the operation animation of the control operation on the cursor interface, and the game picture related to the target game displayed on the user interface still requests a game resource from the cloud server, and is rendered and displayed based on the requested game resource, so that the cloud server only transmits response data (that is, the game resource) requested by the control operation to the terminal device. In this way, when delay of the communication link between the terminal device and the cloud server is relatively low, the game user may achieve the operation experience of locally playing the cloud game. In addition, the operation animation is locally retained for drawing, the delay of displaying the operation animation caused by a frame rate and network delay may be avoided, thereby improving timeliness of displaying the operation animation and improving the operation fluency of the game user.

In the embodiments of present disclosure, in a process of running a target game, a terminal device may request game data of the target game from a target container of a cloud server and render a game picture of the target game on a user interface based on the game data. In addition, the terminal device may obtain a control operation on the target game, draw an operation animation corresponding to the control operation on the user interface according to the obtained control operation, and display the operation animation on the game picture in a superposed manner. The terminal device locally retains the drawing of the operation animation corresponding to the control operation and performs drawing, to improve fluency of the terminal device in a process of drawing an operation animation based on a control operation performed by a game user, so that the game user achieves gaming experience of locally performing a game operation on the terminal device, thereby improving user satisfaction.

Figure 4:
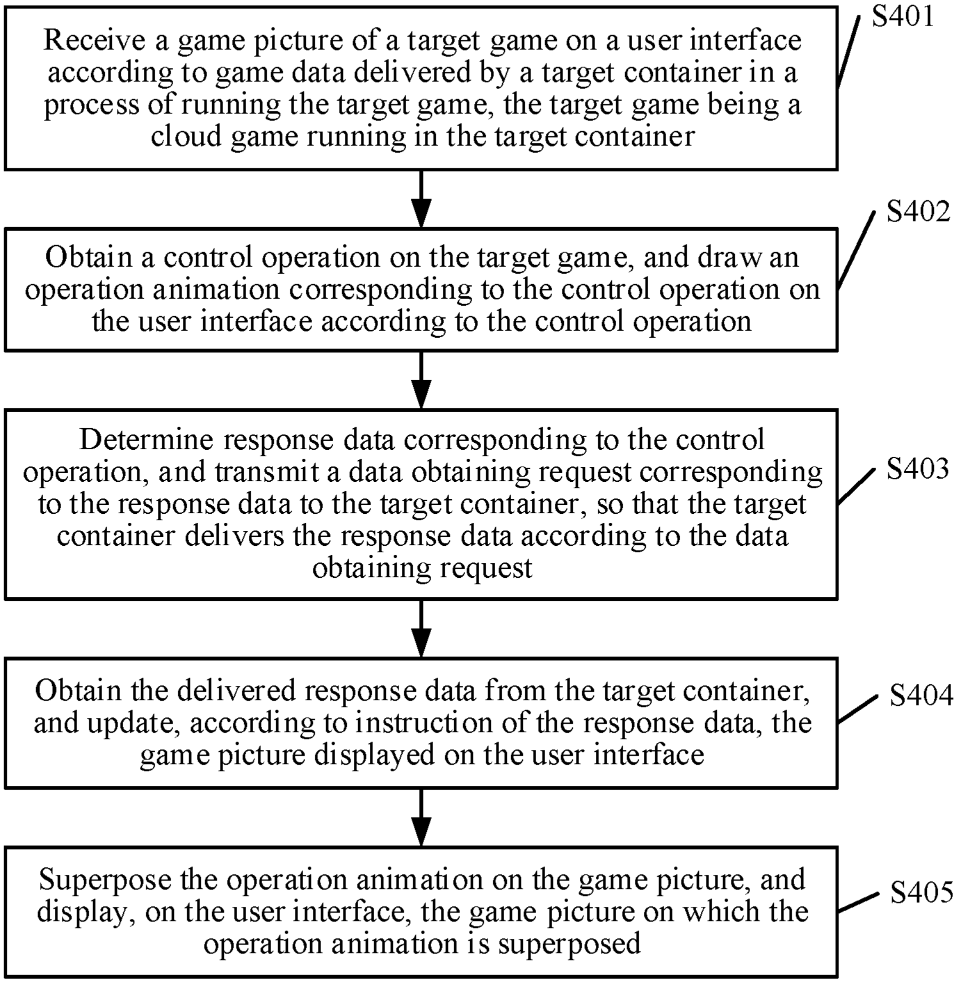
FIG. 4 is a schematic flowchart of a picture display method according to an embodiment of present disclosure.

FIG. 4 is a schematic flowchart of a picture display method according to an embodiment of present disclosure. As shown in FIG. 4, the method may include the following steps:

S401: Receive a game picture of a target game on a user interface according to game data delivered by a target container in a process of running the target game, the target game being a cloud game running on the target container.

After obtaining the game data of the target game from the target container, the terminal device may receive the game picture on the user interface based on the game data, and the terminal device may further determine a control manner for the target game after receiving the game picture of the target game on the user interface. When the target game is a client game running on the personal computer, the control manner for the target game is a first control manner in which the target game is controlled by using the operation cursor, or when the target game is a mobile game running on the mobile terminal, the control manner for the target game is a second control manner in which the target game is controlled in a touch manner.

In an embodiment, when determining the control manner for the target game, the terminal device may first obtain a screen type of the terminal device for displaying the user interface, where the control manner for the target game is determined to be the second control manner of touch control when the screen type is a touch screen type, or when the screen type is a non-touch screen type, the control manner for the target game is determined to be the first control manner in which the target game is controlled by using the operation cursor. When the terminal device determines that the control manner for the target game is the first control manner, the operation cursor of the target game may be rendered on the user interface according to the game data delivered by the target container. When the operation cursor of the target game is rendered on the user interface, the terminal device first obtains a system cursor displayed on the user interface, the system cursor being displayed on the cursor interface (that is, an upper layer of interface of the user interface in a display direction) when the game data is not obtained from the target container. Further, After the terminal device may obtain delivered game data from the target container, the obtained game data is parsed to obtain a target icon for rendering, the target icon being used for identifying the operation cursor of the target game, so that the terminal device may hide the system cursor and the icon of the operation cursor may be rendered on the cursor interface.

Figure 5A:
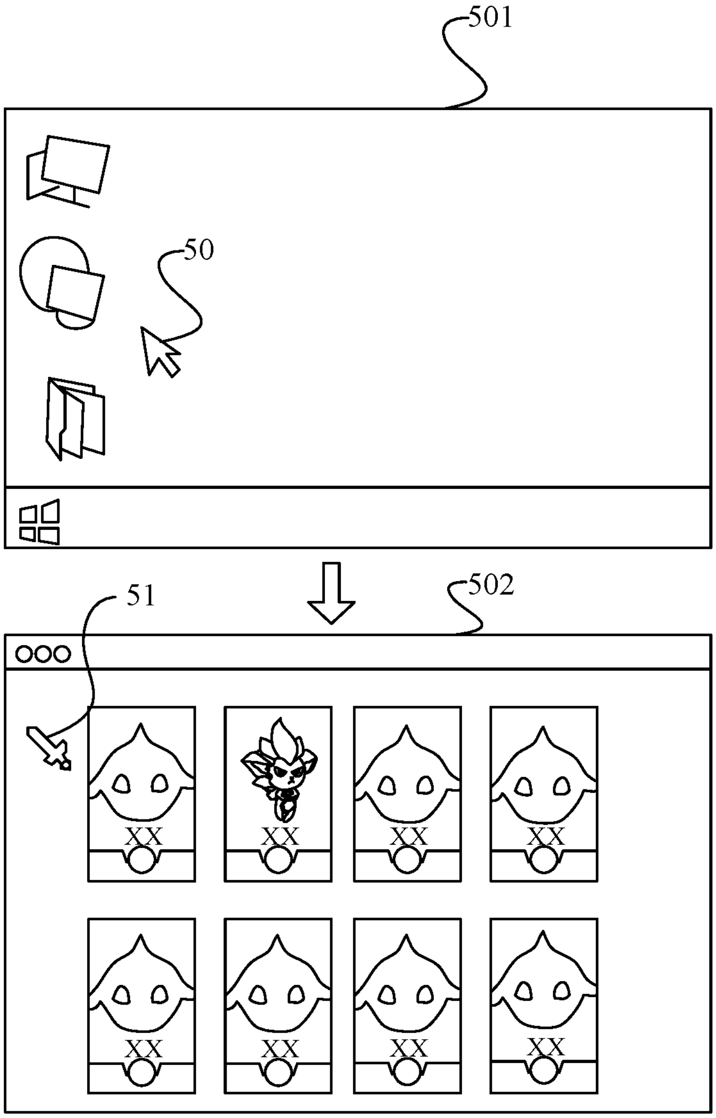
FIG. 5*a* is a schematic diagram of displaying an operation cursor according to an embodiment of present disclosure.

In an embodiment, when the terminal device controls the target game in the first control manner, as shown in FIG. 5*a*, before obtaining the game data from the target container, the terminal device displays a schematic diagram of an interface of the system cursor on the user interface, which may be, for example, a schematic diagram marked by 501 in FIG. 5*a*, where the system cursor displayed on the interface may be, for example, a cursor marked by 50 in FIG. 5*a*. However, after the terminal device obtains the game data from the target container, the game picture received by the terminal device based on the game data may be shown as 502 in FIG. 5*a*, after obtaining the game data, the terminal device may further parse the game data to obtain an icon of the operation cursor of the target game, and display the operation cursor of the target game after displaying the game picture. The shape of the operation cursor of the target game displayed by the terminal device may be the same as that of the system cursor, or the operation cursor of the target game displayed by the terminal device may be different from that of the system cursor. In an embodiment, the operation cursor displayed by the terminal device different from the system cursor may be as shown by the cursor marked by 51 in FIG. 5*a*. In an embodiment, in a process of displaying the operation cursor of the target game, the terminal device may replace the previously displayed system cursor for display. In a specific implementation, the terminal device may display the operation cursor a display position of an original system cursor after canceling the display of the original system cursor, or the terminal device may display the operation cursor of the target game at any random place after canceling the display of the original system cursor.

After displaying the game picture of the target game, the terminal device may draw the operation animation of the obtained control operation on the target game on the user interface, that is, S402 is performed.

S402: Obtain a control operation on the target game, and draw an operation animation corresponding to the control operation on the user interface according to the control operation.

Figure 5B:
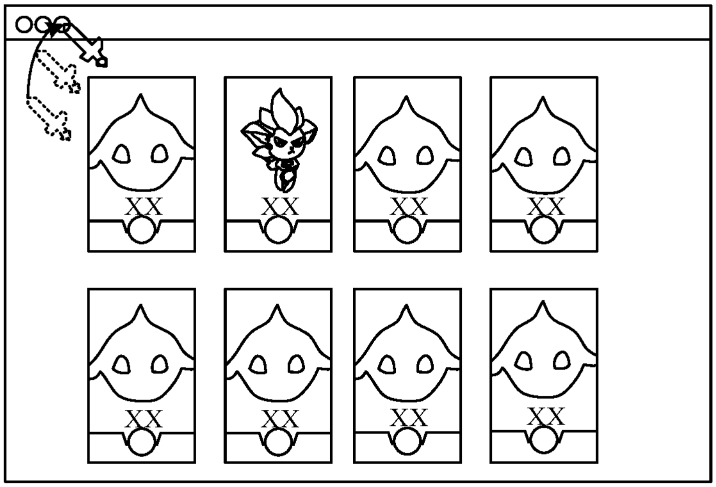
FIG. 5*b* is a schematic diagram of displaying a moving track of an operation cursor according to an embodiment of present disclosure.

In an embodiment, when the target game is a client game running on the personal computer, the operation cursor of the target game is displayed on the user interface, and the control operation on the target game includes a movement operation of the operation cursor, and it may be understood that, when the terminal device draws the operation animation corresponding to the control operation on the user interface (that is, on a cursor interface, the cursor interface being an upper layer of interface of the user interface in a display direction) according to the control operation, a movement operation cursor may be first obtained, the operation cursor is located at an initial display position of the cursor interface. Further, the terminal device may obtain position change information of the operation cursor on the cursor interface according to the movement operation of the operation cursor, so that a moving track corresponding to the movement operation may be drawn on the cursor interface according to the initial display position and the position change information. The schematic diagram of drawing the moving track of the operation cursor by the terminal device may be as shown in FIG. 5*b*. In addition, the control operation on the target game obtained by the terminal device may further include a touch operation on the user interface by the game user. When drawing the operation animation corresponding to the control operation on the user interface according to the control operation, the terminal device may first obtain an operation gesture performing the touch operation on the user interface, and obtain an associated operation animation of the operation gesture. Further, the terminal device may draw the associated operation animation associated with the operation gesture on the user interface. The operation gesture may be, for example, a zoom gesture, and the associated operation animation executed by the terminal device based on the operation gesture is a zoom animation corresponding to the game picture.

In an embodiment, the control operation obtained by the terminal device includes a selection operation performed, where the selection operation may be performed by using an operation cursor, or the selection operation may be performed according to touch on the user interface. When the control operation obtained by the terminal device is the selection operation, and the terminal device draws the operation animation corresponding to the control operation on the user interface according to the control operation, an action position of the selection operation on the user interface may be first determined, and a mapping position of the action position on the game picture is determined, so that the terminal device may obtain a trigger animation associated with the mapping position, and draw the trigger animation at the action position of the selection operation on the user interface. In a specific implementation, when obtaining the trigger animation associated with the mapping position, the terminal device may first determine whether game setting components of the target game are displayed at the mapping position. Rendering code of a trigger animation of a game setting component of the target game is stored in a local memory. When there is a game setting component is displayed at the mapping position, rendering code of a trigger animation associated with the game setting component is obtained from the local memory, and an animation indicated by the rendering code is used as a trigger animation associated with the mapping position. In an embodiment, the game setting component includes a game exit component or a game start component, or an operation setting component, or the like.

Figure 5C:
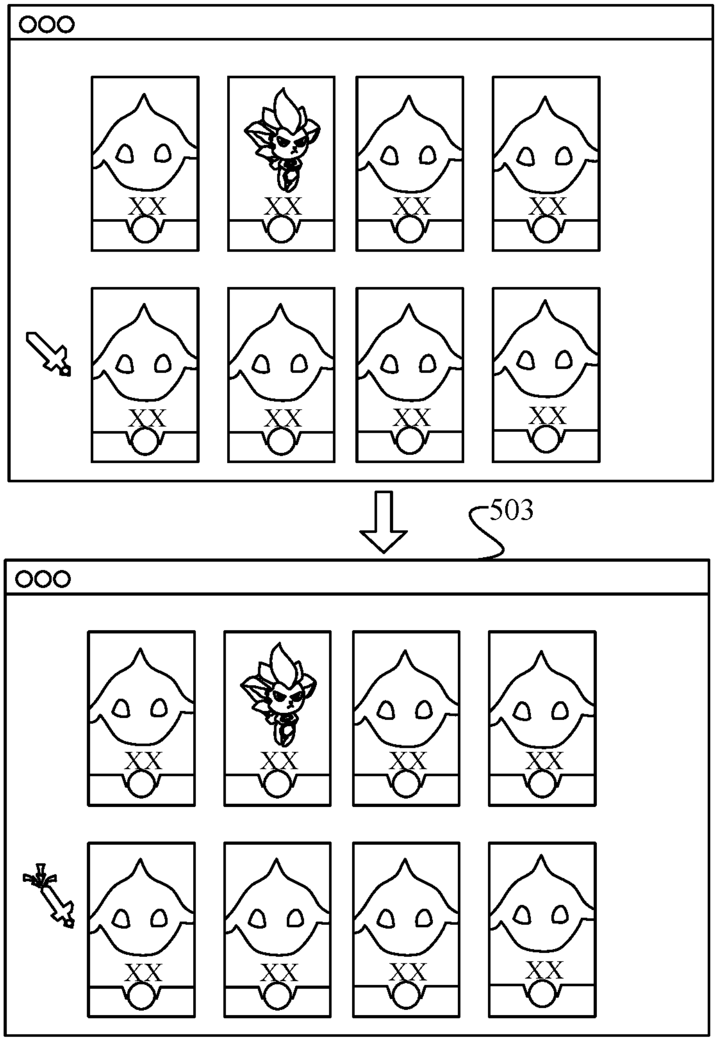
FIG. 5*c* is a schematic diagram of displaying an operation animation of an operation cursor according to an embodiment of present disclosure.

In another embodiment, when the terminal device determines that the game setting component is not displayed at the mapping position of the action position of the selection operation on the game picture, the terminal device may obtain a preset rendering rule, to use an animation indicated by the preset rendering rule as the trigger animation associated with the mapping position. That is, when the terminal device determines that the action position of the selection operation is a blank position at which the game setting component is not displayed, the terminal device may display the trigger animation indicated by the preset rendering rules after the game user performs the selection operation, where the trigger animation indicated by the terminal device according to the preset rendering rule may be, for example, an animation displayed on the interface marked by 503 in FIG. 5*c*.

S403: Transmit a data obtaining request to the target container, the data obtaining request being used to request for obtaining response data corresponding to the control operation.

S404: Obtain the delivered response data from the target container, and update, according to indication of the response data, the game picture displayed on the user interface.

S405: Superpose the operation animation on the game picture, and display, on the user interface, the game picture on which the operation animation is superposed.

S403 and S404 are optional steps. In S403 to S405, after obtaining the control operation on the target game, the terminal device may further determine response data corresponding to the control operation, transmit a data obtaining request corresponding to the response data to target container, to continuously update, after obtaining the response data from target container, the game picture displayed on the user interface based on indication of the response data. In addition, after determining the operation animation of the control operation on the target game, the terminal device may superpose the operation animation on the game picture for displaying. It may be understood that, the operation animation of the control operation on the target game is locally retained on the terminal device for drawing, and response data of the game is requested from the target container, to ensure the fluency of the game user in the process of playing the cloud game. In a specific implementation, when the target game is a client game running on the personal computer, the game picture displayed on the terminal device is any frame of game picture in the game. When the game picture displayed on the terminal device includes a character image of a game character corresponding to the game user, and the control operation on the target game obtained by the terminal device is an operation that selects any blank position in a current game picture, the terminal device may control movement of the game character corresponding to the game user based on the control operation performed by the game user. That is, after obtaining the control operation, the terminal device may locally draw an operation animation (for example, which may be an operation animation marked by 503 in FIG. 5*c*) corresponding to the control operation, and superpose the operation animation on the current game picture for display. In addition, the terminal device further needs to transmit an obtaining request corresponding to the response data to the target container, to obtain game data of the moved game character, thereby receiving the game picture based on the game data, to display a game picture in which the game character moves on the user interface.

Figure 5D:
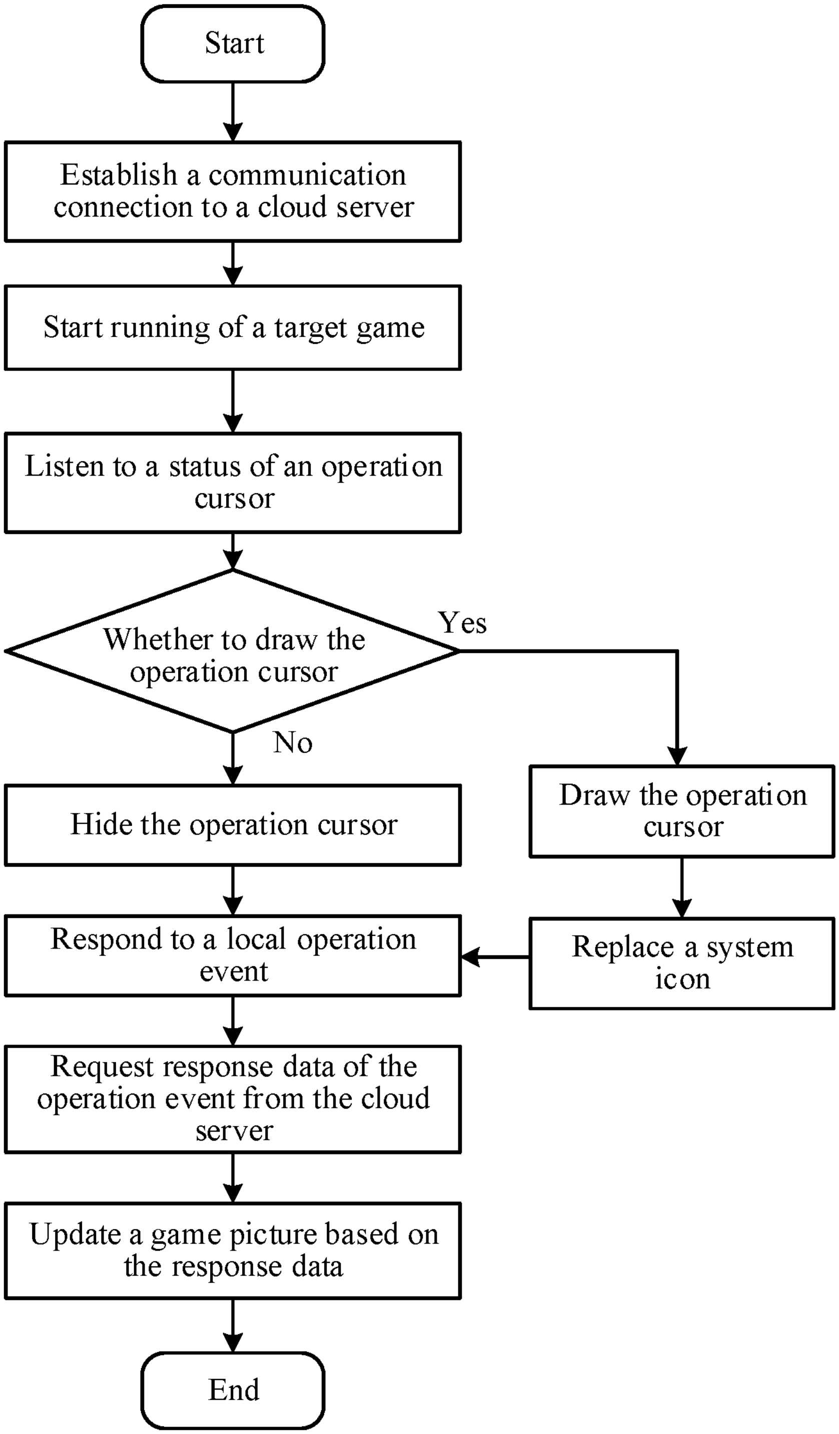
FIG. 5*d* is a schematic flowchart of running a target game by a terminal device according to an embodiment of present disclosure.
Figure 5E:
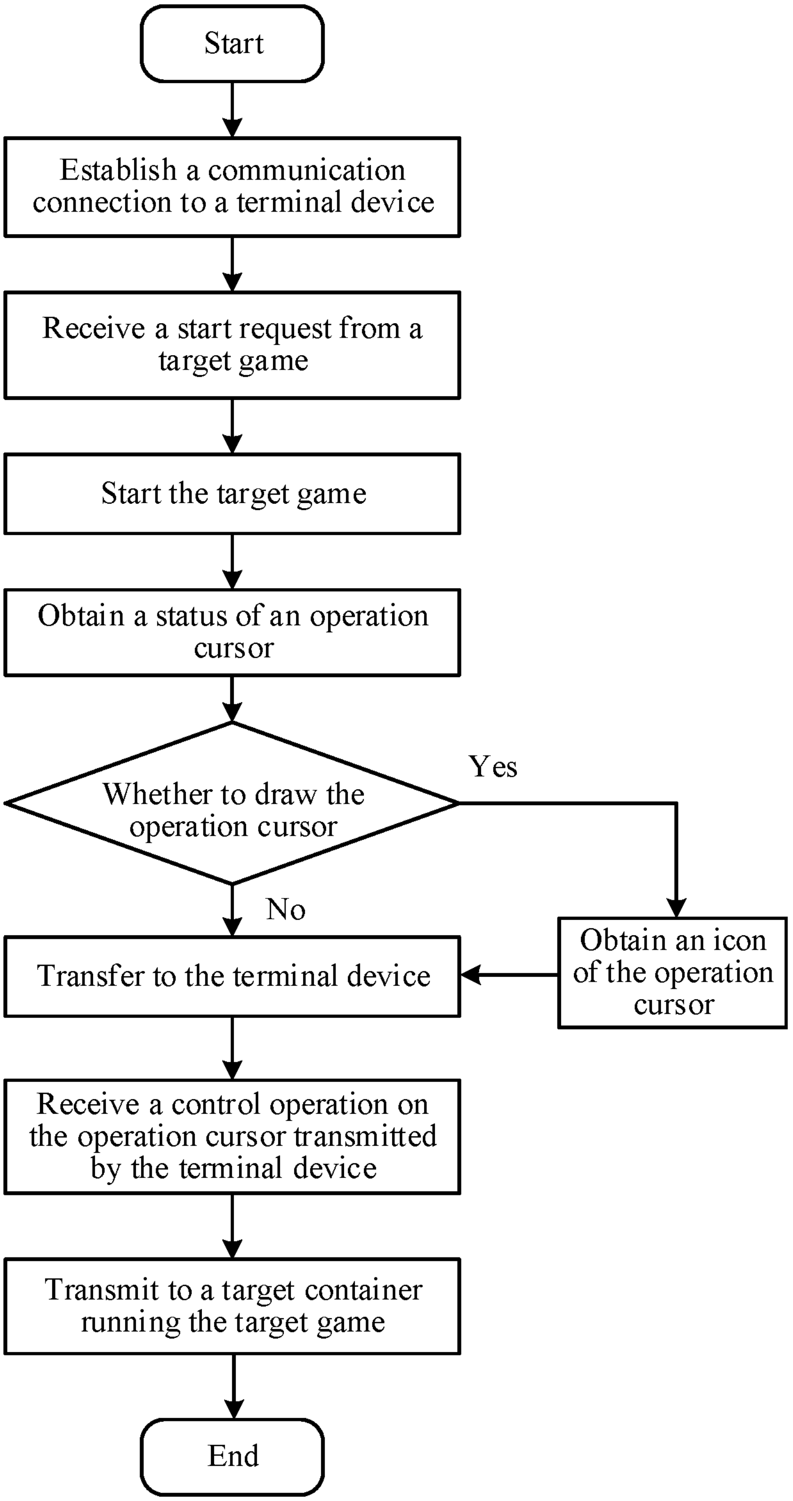
FIG. 5*e* is a schematic flowchart of running a target game by a cloud server according to an embodiment of present disclosure.

In an embodiment, when the terminal device is a personal computer and the game user controls the target game by using the operation cursor, the schematic diagram of running the target game by the terminal device may be shown in FIG. 5*d*, and a procedure of steps performed by the cloud server may be correspondingly shown in FIG. 5*e*. Specifically, in the process of running the target game by the terminal device, an interaction process between the terminal device and the cloud server may include the following steps:

(1) The game user starts the target game in the cloud game client of the terminal device. A communication connection (or network connection) is established between the cloud game client and the cloud server in the terminal device. When the game user requests to start the target game, the terminal device may transmit a game identity (ID) of the target game that needs to be started to the cloud server, and the cloud server may start the target game based on the ID after receiving the ID for starting the target game transmitted by the terminal device. In an embodiment, when the cloud server starts the target game on the terminal device, the game data of the target game may be transmitted to the terminal device, and the terminal device may receive the game picture based on the game data after obtaining the game data, thereby starting the target game, and after starting the target game, the terminal device may obtain a status of the operation cursor. When it is determined that the operation cursor needs to be drawn, the icon corresponding to the operation cursor may be obtained from the obtained game data, and the operation cursor may be rendered and displayed based on the game data.

The cloud server may listen to the status of the operation cursor to determine whether the operation cursor needs to be rendered on the user interface. When the terminal device is a screen of a touch screen type, the cloud server may determine that there is no need to render the operation cursor on the user interface, or the operation cursor may not be rendered on the user interface when the cloud server detects that the terminal device is displaying a special cloud game picture. When the cloud server is a screen of a non-touch screen type on the terminal device, it is determined that there is a need to render the operation cursor on the user interface. In an embodiment, when the cloud server determines that there is a need to render the operation cursor on the user interface, in a process of delivering the game data to the terminal device, the cloud server may collectively deliver the icon of the operation cursor, the rendering code, and the like included in the game data to the terminal device, so that the terminal device renders the operation cursor on the user interface based on the rendering code. When the cloud server determines that there is no need to render the operation cursor on the user interface, in a process of transmitting the game data to the terminal device, the cloud server may not deliver the icon of the operation cursor and corresponding rendering code to the terminal device.

(2) When the game data obtained by the terminal device from the cloud server includes the icon of the operation cursor and the corresponding rendering code, the terminal device may display (in some cases, may render and display) the operation cursor on the user interface. When displaying the operation cursor of the game data, the terminal device may replace a system icon originally displayed on the user interface of the terminal device. The shape of the operation cursor displayed on the user interface may be the same as that of an icon of the system icon, or may be different from the shape of icon of the system icon. The shape of the operation cursor is not limited in this embodiment of present disclosure.

(3) After displaying the operation cursor of the target game, the terminal device may locally draw the operation animation of the control operation performed based on the operation cursor, and transmit operation data of the control operation performed based on the operation cursor to the cloud server, to obtain response data corresponding to the operation data from the cloud server, so that the terminal device may update the game picture displayed on the user interface based on the response data obtained from the cloud server.

(4) After the terminal device requests the cloud server to run the target game, the cloud server may continuously transmit the game data of the target game to the terminal device, to continuously update the game picture on the terminal device. Based on the control operation performed by the game user on the user interface, the terminal device may draw the operation animation of the control operation on the user interface, and superpose the operation animation on the game picture displayed on the user interface, so that the game user may achieve the operation experience of locally playing the game on the terminal device.

In one embodiment of present disclosure, the terminal device may receive the game picture of the target game on the user interface according to the game data delivered by the target container in the process of running the target game, to further obtain a control operation on the target game to draw an operation animation corresponding to the control operation on the user interface. In addition, after obtaining the control operation on the target game, the terminal device may determine response data corresponding to the control operation to transmit a data obtaining request corresponding to the response data to target container, and after obtaining the response data from target container, continuously update the game picture displayed on the user interface based on the response data. The terminal device locally retains the operation animation of the control operation for drawing, and superposes the operation animation on a game picture obtained by rendering the game data requested from the cloud server, so that data processing pressure of the cloud server may be reduced, the data processing efficiency of the cloud server may be improved, and the fluency of the terminal device of displaying the game picture in the process of running the target game may be improved.

Various embodiments of present disclosure provide a picture display apparatus, including: a receiving unit, configured to receive (and/or render in some examples) a game picture of a target game on a user interface according to game data delivered by a target container in a process of running the target game, the target game being a cloud game running on the target container; an obtaining unit, configured to obtain a control operation on the target game; a drawing unit, configured to draw an operation animation corresponding to the control operation on the user interface according to the control operation; a superposition unit, configured to superpose the operation animation on the game picture; and a display unit, configured to display, on the user interface, the game picture on which the operation animation is superposed Based on the foregoing description of the embodiment of the picture display method, an embodiment of present disclosure further provides a picture display apparatus. The picture display apparatus may be a computer program (including program code) run on the terminal device. The picture display apparatus may be configured to perform the picture display method in FIG. 2 and FIG. 4.

Figure 6:
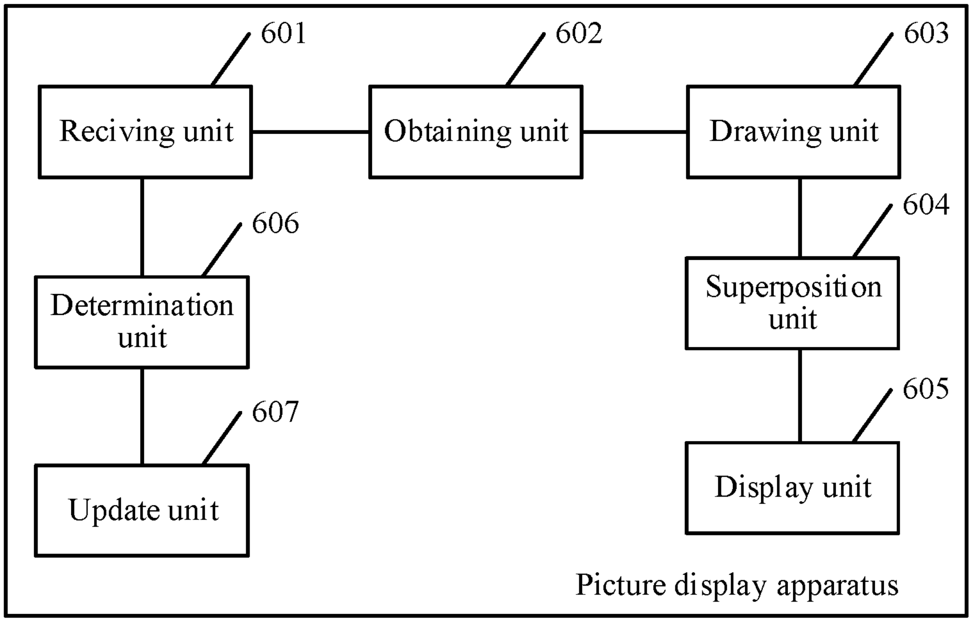
FIG. 6 is a schematic block diagram of a picture display apparatus according to an embodiment of present disclosure.

Referring to FIG. 6, the picture display apparatus includes: a receiving unit 601, an obtaining unit 602, a drawing unit 603, a superposition unit 604, and a display unit 605.

- a receiving unit 601, configured to receive (and/or render in some examples) a game picture of a target game on a user interface according to game data delivered by a target container in a process of running the target game, the target game being a cloud game running on the target container;
- an obtaining unit 602, configured to obtain a control operation on the target game;
- a drawing unit 603, configured to draw an operation animation corresponding to the control operation on the user interface according to the control operation;
- a superposition unit 604, configured to superpose the operation animation on the game picture; and
- a display unit 605, configured to display, on the user interface, the game picture on which the operation animation is superposed.

In an embodiment, an operation cursor of the target game is displayed on the user interface, a cursor interface displaying the operation cursor is an upper layer of interface of the user interface in a display direction, and the control operation includes a movement operation on the operation cursor. the drawing unit 603 is further configured to:

- obtain an initial display position of the operation cursor on the cursor interface when the operation cursor is moved;
- obtain position change information of the operation cursor on the cursor interface according to the movement operation on the operation cursor; and
- draw a moving track corresponding to the movement operation on the cursor interface according to the initial display position and the position change information.

In an embodiment, the control operation includes a touch operation on the user interface; and the drawing unit 603 is further configured to:

- obtain an operation gesture for performing the touch operation on the user interface, and obtain an associated operation animation of the operation gesture; and
- draw the associated operation animation on the user interface.

In an embodiment, the control operation including a selection operation performed according to an operation cursor or performed by touching the user interface; and the drawing unit 603 is further configured to:

- determine an action position of the selection operation on the user interface, and determine a mapping position of the action position on the game picture; and
- obtain a trigger animation associated with the mapping position, and draw the trigger animation at the action position on the user interface.

In an embodiment, the drawing unit 603 is further configured to:

- determine whether there are game setting components of the target game at the mapping position, rendering code of a trigger animation of each game setting component of the target game being stored in a local memory;
- obtain, when the game setting component is displayed at the mapping position, the rendering code of the trigger animation associated with the game setting component from the local memory, and use an animation indicated by the rendering code as the trigger animation associated with the mapping position; and
- obtain a preset rendering rule when the game setting component is not displayed at the mapping position, and use an animation indicated by the preset rendering rule as the trigger animation associated with the mapping position.

In an embodiment, the apparatus further includes a determination unit 606.

The determination unit 606, configured to determine a control manner for the target game, the control manner including a first control manner for controlling the target game by using an operation cursor or a second control manner for controlling the target game through the user interface by touch-control; and

- the receiving unit 601, further configured to receive, when it is determined that the control manner for the target game is the first control manner, the operation cursor of the target game on the user interface according to the game data delivered by the target container.

In an embodiment, the determination unit 606 is configured to:

obtain a screen type of a terminal device configured to display the user interface;

determine, when the screen type is a touch screen type, that the control manner for the target game is the second control manner; and determine, when the screen type is a non-touch screen type, that the control manner for the target game is the first control manner.

In an embodiment, an interface that displays the operation cursor is a cursor interface of the user interface. The receiving unit 601 is further configured to:

obtain a system cursor displayed on the cursor interface, the system cursor being displayed on the cursor interface when the game data is not obtained from the target container;

parse the game data delivered by the target container to obtain a target icon for rendering, the target icon being used for identifying the operation cursor of the target game; and hide the system cursor, an icon of the operation cursor may be rendered on the cursor interface of the user interface.

In an embodiment, the apparatus further includes an update unit 607.

The determination unit 606 is further configured to transmit a data obtaining request to the target container, the data obtaining request being used to request for obtaining response data corresponding to the control operation; and the update unit 607 is configured to obtain the delivered response data from the target container, and update, according to indication of the response data, the game picture displayed on the user interface.

In the embodiments of present disclosure, in a process of running a target game, the receiving unit 601 may request game data of the target game from a target container of a cloud server and receive (and/or render in some examples) a game picture of the target game on a user interface based on the game data. In addition, the obtaining unit 602 may obtain a control operation on the target game, so that the drawing unit 603 may draw an operation animation corresponding to the control operation on the user interface according to the obtained control operation, and the display unit 605 may display the operation animation on the game picture in a superposed manner. The drawing of the operation animation corresponding to the control operation is locally retained for drawing, to improve fluency in a process of drawing an operation animation based on a control operation performed by a game user, so that the game user achieves gaming experience of locally performing a game operation, thereby improving user satisfaction.

Figure 7:
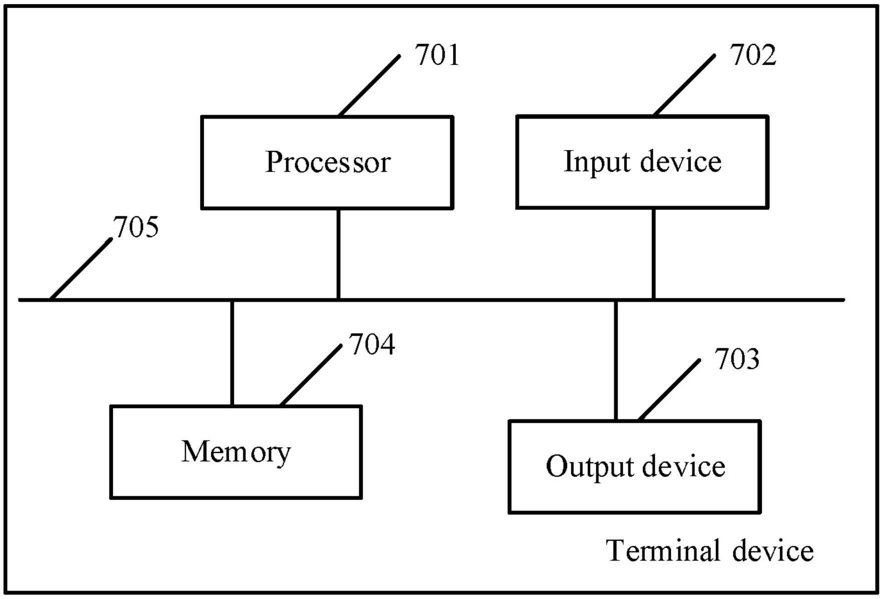
FIG. 7 is a schematic block diagram of a terminal device according to an embodiment of present disclosure.

FIG. 7 is a schematic block diagram of a structure of a terminal device according to an embodiment of present disclosure. The terminal device in this embodiment shown in FIG. 7 may include: one or more processors 701, one or more input devices 702, one or more output devices 703, and a memory 704. The processor 701, the input device 702, the output device 703, and the memory 704 are connected through a bus 705. The memory 704 is configured to store a computer program, and the computer program includes program instructions. The processor 701 is configured to execute the program instructions stored in the memory 704.

The memory 704 may include a volatile memory such as a random-access memory (RAM). The memory 704 may also include a non-volatile memory such as a flash memory, a solid-state drive (SSD), or the like. The memory 704 may alternatively include a combination of the foregoing types of memories.

The processor 701 may be a central processing unit (CPU). The processor 701 may further include a hardware chip. The foregoing hardware chip may be an application-specific integrated circuit (ASIC), a programmable logic device (PLD), or the like. The PLD may be a field programmable gate array (FPGA), generic array logic (GAL), or the like. The processor 701 may alternatively be a combination of the foregoing structures.

In this embodiment of present disclosure, the memory 704 is configured to store a computer program, and the computer program includes program instructions. The processor 701 is configured to execute the program instructions stored in the memory 704, to implement the steps of corresponding methods shown in FIG. 2 and FIG. 4.

In an embodiment, the processor 701 is configured to invoke the program instructions to perform the following operations:

receiving a game picture of a target game on a user interface according to game data delivered by a target container in a process of running the target game, the target game being a cloud game running on the target container;

obtaining a control operation on the target game, and drawing an operation animation corresponding to the control operation on the user interface according to the control operation; and superposing the operation animation on the game picture, and displaying, on the user interface, the game picture on which the operation animation is superposed.

An embodiment of present disclosure provides a computer program product or a computer program. The computer program product or the computer program includes computer instructions, and the computer instructions are stored in a computer-readable storage medium. A processor of the computer device reads the computer instructions from the computer-readable storage medium, and executes the computer instructions, to cause the computer device to perform the method embodiments shown in FIG. 2 or FIG. 4. The computer readable storage medium may be a magnetic disk, an optical disc, a read-only memory (Read-Only Memory, ROM), a random access memory (Random Access Memory, RAM), or the like.

An embodiment of present disclosure provides a non-transitory computer-readable storage medium storing program instructions, the program instructions, when executed by a processor, causing the processor to perform a picture display method.

An embodiment of present disclosure further provides a computer program product including instructions, the instructions, when run on a computer, causing the computer to perform the method according to the foregoing embodiments.

The term unit (and other similar terms such as subunit, module, submodule, etc.) in the present disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The foregoing descriptions are merely some embodiments of present disclosure, and are not intended to limit the scope of present disclosure. A person skilled in the art may understand all or some processes of the foregoing embodiments, and equivalent modifications made according to the claims of present disclosure shall still fall within the scope of the present disclosure.

What is claimed is:

1. A picture display method, performed by a terminal device, the method comprising:

receiving a game picture of a target game from a target container in a process of running the target game, the target game being a cloud game running on the target container;

obtaining a control operation on the target game performed on the terminal device, the target game being controlled by an operation cursor;

locally drawing an operation animation according to the control operation; and superposing the operation animation on the received game picture, and displaying, on a user interface, the game picture on which the operation animation is superposed; and rendering the operation cursor of the target game according to the game data delivered by the target container, comprising:

obtaining a system cursor displayed on a cursor interface, wherein the cursor interface is an upper layer interface of the user interface in a display direction, the system cursor being displayed on the cursor interface when the game data is not obtained from the target container;

parsing the game data delivered by the target container to obtain a target icon for rendering, the target icon indicating the operation cursor of the target game; and hiding the system cursor and rendering the target icon of the operation cursor on the cursor interface.

2. The method according to claim 1, wherein the control operation comprises a movement operation on the operation cursor; and drawing the operation animation corresponding to the control operation on the user interface according to the control operation comprises:

obtaining an initial display position of the operation cursor on the cursor interface when the operation cursor is moved;

obtaining position change information of the operation cursor on the cursor interface according to the movement operation on the operation cursor; and drawing a moving track corresponding to the movement operation on the cursor interface according to the initial display position and the position change information.

3. The method according to claim 1, wherein the control operation comprises a touch operation on the user interface; and drawing the operation animation corresponding to the control operation on the user interface according to the control operation comprises:

obtaining an operation gesture for performing the touch operation on the user interface, and obtaining an associated operation animation of the operation gesture; and drawing the associated operation animation on the user interface.

4. The method according to claim 1, wherein the control operation comprises a selection operation performed according to the operation cursor or performed by touching the user interface; and drawing the operation animation corresponding to the control operation on the user interface according to the control operation comprises:

determining an action position of the selection operation on the user interface, and determining a mapping position of the action position on the game picture; and obtaining a trigger animation associated with the mapping position, and drawing the trigger animation at the action position on the user interface.

5. The method according to claim 4, wherein obtaining the trigger animation associated with the mapping position comprises:

determining whether there are game setting components of the target game at the mapping position, rendering code of a trigger animation of a game setting component of the target game being stored in a local memory;

obtaining, when the game setting component is displayed at the mapping position, the rendering code of the trigger animation associated with the game setting component from the local memory, and using an animation indicated by the rendering code as the trigger animation associated with the mapping position; and obtaining a preset rendering rule when the game setting component is not displayed at the mapping position, and using an animation indicated by the preset rendering rule as the trigger animation associated with the mapping position.

6. The method according to claim 1, further comprising:

determining a control manner for the target game, the control manner comprising a first control manner for controlling the target game by using the operation cursor or a second control manner for controlling the target game through the user interface by touch-control.

7. The method according to claim 6, wherein determining the control manner for the target game comprises:

obtaining a screen type of a terminal device configured to display the user interface;

determining, when the screen type is a touch screen type, that the control manner for the target game is the second control manner; and determining, when the screen type is a non-touch screen type, that the control manner for the target game is the first control manner.

8. The method according to claim 1, further comprising:

transmitting a data obtaining request to the target container, the data obtaining request being used to request for obtaining response data corresponding to the control operation; and obtaining the delivered response data from the target container, and updating, according to indication of the response data, the game picture displayed on the user interface.

9. A terminal device, comprising:

a processor and a memory coupled to the processor, the memory being configured to store a computer program comprising program instructions, and the processor being configured to invoke the program instructions to perform:

receiving a game picture of a target game on a user interface according to game data delivered by a target container in a process of running the target game, the target game being a cloud game running on the target container;

obtaining a control operation on the target game performed on the terminal device, the target game being controlled by an operation cursor;

locally drawing an operation animation according to the control operation; and superposing the operation animation on the received game picture, and displaying, on a user interface, the game picture on which the operation animation is superposed; and rendering the operation cursor of the target game according to the game data delivered by the target container, comprising:

obtaining a system cursor displayed on a cursor interface, wherein the cursor interface is an upper layer interface of the user interface in a display direction, the system cursor being displayed on the cursor interface when the game data is not obtained from the target container;

parsing the game data delivered by the target container to obtain a target icon for rendering, the target icon indicating the operation cursor of the target game; and hiding the system cursor and rendering the target icon of the operation cursor on the cursor interface.

10. The terminal device according to claim 9, wherein the control operation comprises a movement operation on the operation cursor; and drawing the operation animation corresponding to the control operation on the user interface according to the control operation comprises:

obtaining an initial display position of the operation cursor on the cursor interface when the operation cursor is moved;

obtaining position change information of the operation cursor on the cursor interface according to the movement operation on the operation cursor; and drawing a moving track corresponding to the movement operation on the cursor interface according to the initial display position and the position change information.

11. The terminal device according to claim 9, wherein the control operation comprises a touch operation on the user interface; and drawing the operation animation corresponding to the control operation on the user interface according to the control operation comprises:

obtaining an operation gesture for performing the touch operation on the user interface, and obtaining an associated operation animation of the operation gesture; and drawing the associated operation animation on the user interface.

12. The terminal device according to claim 9, wherein the control operation comprises a selection operation performed according to the operation cursor or performed by touching the user interface; and drawing the operation animation corresponding to the control operation on the user interface according to the control operation comprises:

determining an action position of the selection operation on the user interface, and determining a mapping position of the action position on the game picture; and obtaining a trigger animation associated with the mapping position, and drawing the trigger animation at the action position on the user interface.

13. The terminal device according to claim 12, wherein obtaining the trigger animation associated with the mapping position comprises:

determining whether there are game setting components of the target game at the mapping position, rendering code of a trigger animation of a game setting component of the target game being stored in a local memory;

obtaining, when the game setting component is displayed at the mapping position, the rendering code of the trigger animation associated with the game setting component from the local memory, and using an animation indicated by the rendering code as the trigger animation associated with the mapping position; and obtaining a preset rendering rule when the game setting component is not displayed at the mapping position, and using an animation indicated by the preset rendering rule as the trigger animation associated with the mapping position.

14. The terminal device according to claim 9, wherein the processor is further configured to perform:

determining a control manner for the target game, the control manner comprising a first control manner for controlling the target game by using the operation cursor or a second control manner for controlling the target game through the user interface by touch-control.

15. The terminal device according to claim 14, wherein determining the control manner for the target game comprises:

obtaining a screen type of a terminal device configured to display the user interface;

determining, when the screen type is a touch screen type, that the control manner for the target game is the second control manner; and determining, when the screen type is a non-touch screen type, that the control manner for the target game is the first control manner.

16. The terminal device according to claim 9, wherein the processor is further configured to perform:

transmitting a data obtaining request to the target container, the data obtaining request being used to request for obtaining response data corresponding to the control operation; and obtaining the delivered response data from the target container, and updating, according to indication of the response data, the game picture displayed on the user interface.

17. A non-transitory computer-readable storage medium, storing a computer program comprising program instructions, the program instructions, when executed by a processor, causing the processor to perform:

receiving a game picture of a target game on a user interface according to game data delivered by a target container in a process of running the target game, the target game being a cloud game running on the target container;

obtaining a control operation on the target game performed on the terminal device, the target game being controlled by an operation cursor;

locally drawing an operation animation according to the control operation; and superposing the operation animation on the received game picture, and displaying, on a user interface, the game picture on which the operation animation is superposed; and rendering the operation cursor of the target game according to the game data delivered by the target container, comprising:

obtaining a system cursor displayed on a cursor interface, wherein the cursor interface is an upper layer interface of the user interface in a display direction, the system cursor being displayed on the cursor interface when the game data is not obtained from the target container;

parsing the game data delivered by the target container to obtain a target icon for rendering, the target icon indicating the operation cursor of the target game; and hiding the system cursor and rendering the target icon of the operation cursor on the cursor interface.

18. The storage medium according to claim 17, wherein the control operation comprises a movement operation on the operation cursor; and drawing the operation animation corresponding to the control operation on the user interface according to the control operation comprises:

obtaining an initial display position of the operation cursor on the cursor interface when the operation cursor is moved;

obtaining position change information of the operation cursor on the cursor interface according to the movement operation on the operation cursor; and drawing a moving track corresponding to the movement operation on the cursor interface according to the initial display position and the position change information.

* * * * *